Aug. 14, 1923.
W. WEBBER
DRIVING MECHANISM
Filed Sept. 9, 1922
1,464,736
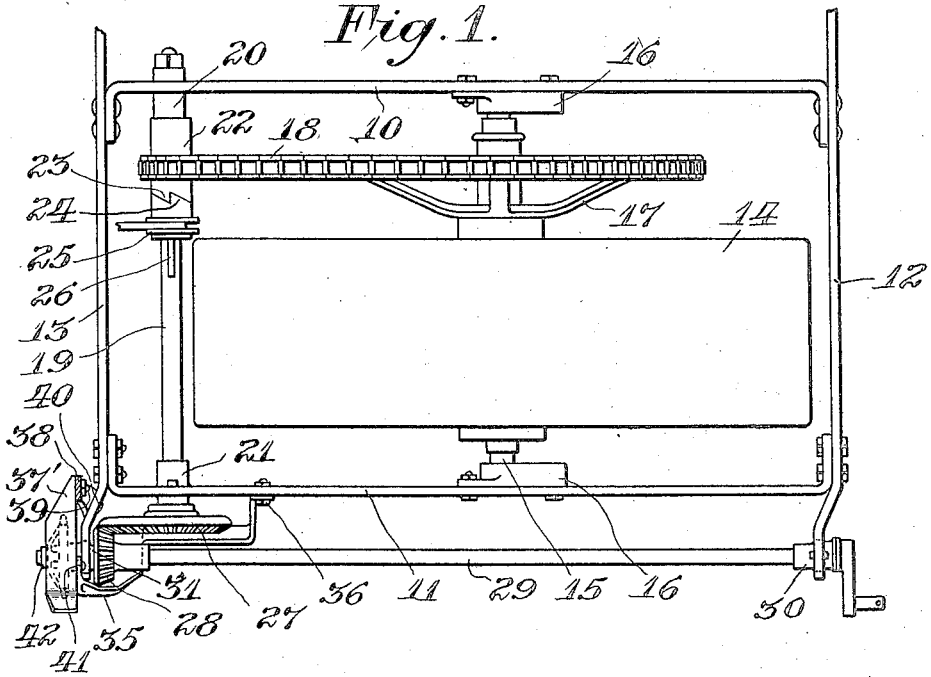
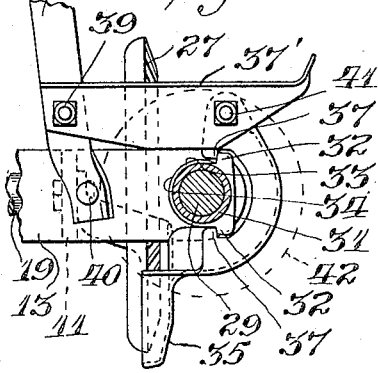
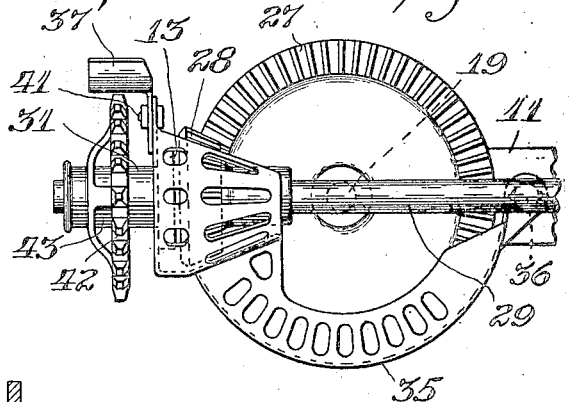
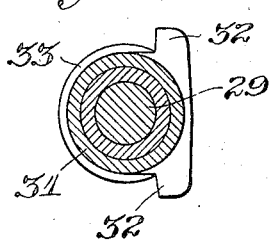
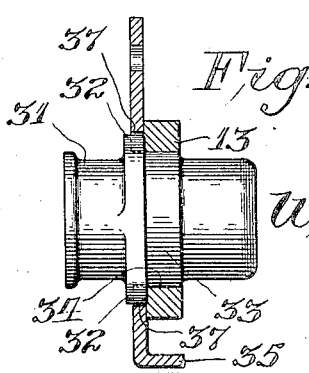
Inventor.
William Webber,
By H. P. Doolittle,
Atty.

Patented Aug. 14, 1923.

1,464,736

UNITED STATES PATENT OFFICE.

WILLIAM WEBBER, OF LA GRANGE, ILLINOIS, ASSIGNOR TO INTERNATIONAL HARVESTER COMPANY, OF CHICAGO, ILLINOIS, A CORPORATION OF NEW JERSEY.

DRIVING MECHANISM.

Application filed September 9, 1922. Serial No. 587,044.

*To all whom it may concern:*

Be it known that I, WILLIAM WEBBER, a citizen of the United States, residing at La Grange, in the county of Cook and State of Illinois, have invented certain new and useful Improvements in Driving Mechanism, of which the following is a full, clear, and exact specification.

My invention relates to a driving mechanism or more particularly to a bearing supporting structure which is adapted for use in connection with a crank shaft of a harvester.

One of the objects of my invention is to provide a novel arrangement for supporting a bearing bushing of a shaft.

A further object is to provide a simple and economical construction of a driving mechanism in which a shield substantially covers said mechanism and at the same time supports a bearing bushing against rotation.

These and other objects are attained by a construction and arrangement of the various parts as hereinafter described and particularly pointed out in the appended claims.

Referring to the drawings illustrating the preferred form of my invention—

Fig. 1 is a top plan view of the main frame of a harvester;

Fig. 2 is an enlarged detail view showing a cross section of the bearing bushing and the manner in which it is supported by the shield;

Fig. 3 is an enlarged detail side elevational view of the shield showing the manner in which it is attached to the frame; and Figs. 4 and 5 are enlarged detail views of the bearing bushing for the crank shaft.

My improved bearing box and shield construction are here shown embodied in the harvester frame which comprises two oppositely and longitudinally disposed frame members 10 and 11, connected at their forward and rearward ends by transversely disposed main frame members 12 and 13 respectively. Mounted in the main frame of the harvester is the usual main wheel 14 with its shaft 15 adjustably secured in the brackets 16 fixed to the longitudinal frame members 10 and 11. Secured to the main wheel 15 is the usual main drive sprocket 17 which is adapted to drive the chain 18 for driving the operating elements of the harvester. Journaled in the rear end of the main frame is a main shaft 19 supported by bearing bushings 20 and 21 fixed to the main frame members 10 and 11 respectively. Loosely journaled on the shaft 19 is a driven sprocket 22 which is geared to the main drive sprocket 17 by a main chain 18. The sprocket 22 is provided with clutch teeth 23 which are adapted to engage similar clutch teeth 24 of a driving collar 25 splined to the shaft 19 by a key 26. Fixed to the shaft 19 adjacent the stubbleward end thereof is a gear 27 adapted to mesh with and drive a pinion 28 fixed on the crank shaft 29 mounted in the transversely disposed frame members 12 and 13. The forward end of the crank shaft 29 is supported in the main frame member 12 by a bushing 30.

My improved bearing box and gear shield construction comprises a bushing 31 having ears 32 extending therefrom and an annular raised portion 33 positioned adjacent said ears and adapted to be seated in an aperture 34 formed in the stubbleward end of a transversely disposed main frame member 13. The lower portion of the gears 27 and 28 are guarded against obstruction by a shield 35 secured at its forward end to the longitudinal frame member 11 by a bolt 36. The rearward end of the shield 35 is provided with hook portions 37 which are adapted to engage the ears 32 of the bushing 31 in a manner to prevent or retain the bushing 31 against rotation on the crank 29. The rear end of the shield 35 is held securely in position by a sprocket guard 37' fixed to a member 38 by means of a bolt 39. The member 38 is secured to the main frame member 13 by a bolt 40. The rear end of the shield 35 is fixed to the sprocket guard 37' by means of a bolt 41. The bearing bushing 31 is held against longitudinal displacement by a sprocket 42 having its hub 43 engaging the rearward end of the bushing. From the above description it will be seen that I have provided a simple and economical construction and one which may be easily manufactured and quickly assembled. By this arrangement, the position of the shield which guards the main shaft gear and crank shaft pinion, at the same time, secures the bushing in its position and thereby eliminates any excess parts that are ordinarily used in this general construction.

I have, in the above specification, described one embodiment which my invention may assume but it will be understood that the same is capable of modification and that modification may be made without departing from the spirit and scope of my invention as expressed in the following claims.

I claim as my invention:

1. In a driving mechanism, a frame, a drive shaft mounted on said frame and having a gear fixed thereto, a driven shaft mounted on said frame having a gear fixed thereto and meshing with said first mentioned gear, a bushing mounted on said frame forming a bearing for said drive shaft and a shield covering said gears and engageable with said bushing for retaining said bushing against rotation.

2. In a driving mechanism, a frame, a drive shaft positioned transversely on said frame and having a gear fixed to one end thereof, a driven shaft positioned longitudinally on said frame and having a gear fixed to one end thereof in meshing relation to said first mentioned gear, a self-aligning bushing mounted on said frame forming a bearing for said driven shaft, and a shield covering said gears fixed to said frame and engageable with said bushing for retaining the same against rotation.

3. In a driving mechanism, a frame, a drive shaft positioned transversely on said frame and having a gear fixed to one end thereof, a driven shaft positioned longitudinally on said frame and having a gear fixed to one end thereof in meshing relation with said first mentioned gear, a self-aligning bushing mounted on said frame forming a bearing for said driven shaft and having projecting ears, and a shield covering said gears fixed to said frame and having hook engaging portions adapted to engage said ears for retaining said bushing against rotation.

4. In a driving mechanism, a frame comprising longitudinally and transversely disposed frame members, longitudinally and transversely disposed shafts mounted on said frame members, gears fixed to said shafts and positioned in meshing relation with each other, a bushing carried by said transverse frame member forming a bearing for said longitudinally disposed shaft, a guard positioned above said last named shaft, and a shield covering said gears fixed to the longitudinally disposed frame member and connected to said guard and engageable with said bushing for preventing rotation of said bushing.

In testimony whereof I affix my signature.

WILLIAM WEBBER.